United States Patent [19]

Kim et al.

[11] Patent Number: 5,164,152
[45] Date of Patent: Nov. 17, 1992

[54] METHOD FOR REDUCING FLOW ASSISTED CORROSION OF CARBON STEEL COMPONENTS

[75] Inventors: Young J. Kim, Clifton Park; Leonard W. Niedrach, Schenectady, both of N.Y.

[73] Assignee: General Electric Company, Schenectady, N.Y.

[21] Appl. No.: 739,546

[22] Filed: Aug. 2, 1991

[51] Int. Cl.$^5$ .................................. G21C 9/00
[52] U.S. Cl. ........................ 376/305; 376/306
[58] Field of Search ............... 376/300, 301, 305, 306

[56] References Cited

U.S. PATENT DOCUMENTS

| | | | |
|---|---|---|---|
| 3,343,979 | 10/1967 | Hamrin | 117/100 |
| 3,783,005 | 1/1974 | Kenney et al. | 117/212 |
| 4,097,402 | 6/1978 | Grabb | 252/301.1 |
| 4,123,594 | 10/1978 | Chang | 428/651 |
| 4,477,538 | 10/1984 | Clarke | 428/656 |
| 4,842,811 | 6/1989 | Desilva | 376/301 |
| 4,917,968 | 4/1990 | Tuffias et al. | 428/621 |

FOREIGN PATENT DOCUMENTS

| | | |
|---|---|---|
| 0145262 | 6/1985 | European Pat. Off. |
| 0235954 | 3/1987 | European Pat. Off. |
| 1210496 | 2/1966 | Fed. Rep. of Germany |

OTHER PUBLICATIONS

"Increasing the Passivability and Corrosion Resistance of Stainless Steels by Surface Alloying with Palladium", Chernova, G. P. et al., Plenum Publishing Corporation, UDC 620.197.3 (1982) pp. 406-411.

"Protective Coatings for Radiation Control in Boiling Water Nuclear Power Reactors", T. V. Rao, R. W. Vook, W. Meyer, and C. Wittwer, J. Vac. Sci. Technology. A 5 (4) (Jul./Aug. 1987) pp. 2701-2705.

"Palladium Impedes Radionuclide Pick-Up in Steel", Platinum Met. Rev., Oct., 1989, vol. 33 (4), p. 185.

"Thin Films to Impede the Incorporation of Radionuclides in Austenitic Stainless Steels", H. Ocken, C. C. Lin, D. H. Lisher, vol. 171, 1989, pp. 323-334.

"Hydrogen Water Chemistry Technology for BWRs", J. N. Kass, R. L. Cowan, Proceedings of the Second International Symposium on Environmental Degradation of Materials in Nuclear Power Systems-Water Reactors, American Nuclear Society, 1986, pp. 211-217.

"Water Chemistry of Nuclear Power Plants", W. T. Lindsey, Jr., Proceedings of the Second International Symposium on Environmental Degradation of Materials in Nuclear Power Systems-Water Reactors, American Nuclear Society, 1986, pp. 203-210.

"Platinum Metals in Stainless Steels", I. R. McGill, Platinum Metals Review, 1990, vol. 34 (2), pp. 85-97.

"Alloying Stainless Steels with the Platinum Metals", M. A. Streicher, Platinum Metals Review, 1977, vol. 21, pp. 51-55.

"Development of Pitting Resistant Fe-Cr-Mo Alloys", M. S. Streicher, Corrosion-Nace, vol. 30, No. 3, Mar. 1974, pp. 77-91.

"Increasing the Passivation Ability and Corrosion Resistance of Chromium Steel by Surface Alloying with Palladium", G. P. Chernova, T. A. Fedoseeva, L. P. Kornienko, N. D. Tomashov, Surface Technology, vol. 13, 1981, pp. 241-256.

"Deposition and Characterization of Electroless Palladium on Austenitic Stainless Steel" H. Ocken, B. G. Pound, D. H. Lister, Thin Solids Films, vol. 177, pp. 313-322.

"Effect of Palladium Coatings on the Corrosion Potential of Stainless Steel in High-Temperature Water Con- (List continued on next page.)

*Primary Examiner*—Brooks H. Hunt
*Assistant Examiner*—Frederick H. Voss
*Attorney, Agent, or Firm*—James E. McGinness; James C. Davis, Jr.; James Magee, Jr.

[57] ABSTRACT

A method of reducing flow assisted corrosion of a carbon steel component exposed to flowing low-oxygen water is disclosed. The method comprises forming a coating of a platinum group metal on the carbon steel component, and providing a ratio of hydrogen to oxygen of about 1:8 or greater in the water.

2 Claims, 3 Drawing Sheets

OTHER PUBLICATIONS taining Dissolved Hydrogen and Oxygen", L. W. Niedrach, Corrosion, vol. 47, No. 3, Mar. 1991, pp. 162–169.

"Errosion-Corrosion in Nuclear Power Systems-An Overview", G. Cragnilino, Paper No. 86, Corrosion 87, Mar. 9–13, 1987, pp. 1–12.

"Corrosion and/or Errosion in BWR Plants and Their Countermeasures", M. Izumiya, A. Minato, F. Hataya, K. Ohsumi, Y. Ohshima, S. Ueda, Proceedings Series, International Atomic Energy Agency, Nov. 22–26, 1982, pp. 61–71.

"How Stainless Steel Coating Combats Erosion/Corrosion in Wet Steam", Pipework Developments, Nuclear Engineereing International, May 1989, pp. 16–19.

METHOD FOR REDUCING FLOW ASSISTED CORROSION OF CARBON STEEL COMPONENTS

CROSS REFERENCE TO RELATED APPLICATION

This application relates to copending applications Ser. No. 07/502,721, filed Apr. 2, 1990; Ser. No. 07/502,720, filed Apr. 2, 1990, and Ser. No. 07/698,885 filed May 13, 1991, all incorporated herein by reference.

BACKGROUND OF THE INVENTION

This invention relates to reducing the flow assisted corrosion of carbon steel components exposed to flowing water having a low oxygen content of about 150 parts per billion or less, herein referred to as low-oxygen water. As used herein the terms "parts per billion," or "ppb" is of mass. As used herein the term "flow assisted corrosion" means the effect of fluid flow that accelerates general corrosion by increasing the rate of mass transport of reactive species to and from the metal surface, and acceleration or increase in the rate of corrosion caused by the relative movement between a corrosive fluid and the metal surface.

Low-oxygen water can be found in a variety of known apparatus, such as water deaerators, nuclear reactors, and in steam driven central station power generation systems. Nuclear reactors are used in central-station electric power generation, research, propulsion, and for dual purposes thereof. A reactor pressure vessel contains the reactor coolant, i.e. water, which removes heat from the nuclear reactor core. Piping circuits carry the heated water or steam to the steam generators or turbines, and circulated water or feedwater back to the vessel In nuclear reactors, the low-oxygen water is typically found in the feedwater, and the feedwater piping circuits are most subject to the flow assisted corrosion Corrosion products in reactors cause problems relating to radiation level, radioactive waste, and heat transfer, so control of corrosion products is very important.

Carbon steels are extensively used in low pressure and high pressure turbine sections, and feedwater heaters in nuclear power plants including many ancillary components of the steam-water circuit, such as moisture separators, and reheaters. In these components high flow velocities under single-phase, water, or two-phase, wet steam, conditions prevail.

Damage associated with flow assisted corrosion of such power plant components generally occurs at locations where there is severe fluid turbulence adjacent to the metal surface, either from high fluid velocities, e.g., greater than 2 meters per second, or due to the presence of features such as bends or orifices that generate high local turbulence levels. A thin layer of oxide; one micron or less, is normally present on the corroding surface, but the rate of penetration in these localized areas deprived of a characteristic double layer oxide film can reach values as high as 0.1 to 10 millimeters per year. Such rates of metal removal are unacceptable in power plants which have a design lifetime of 30 to 40 years, but even significantly lower rates of attack may generate undesirable high concentrations of corrosion products in the water circuits.

Iron release rates from carbon steel decrease by up to two orders of magnitude over the temperature range of 38° to 204° C. with increasing oxygen concentration from 1 to 200 parts per billion. It is expected that flow assisted corrosion rates follow this type of behavior. For example, it has been shown that a low alloy steel containing 0.5 percent molybdenum exposed to water at 120° C., exhibits a decrease of more than four orders of magnitude in the flow assisted corrosion rate at oxygen concentrations above 150 parts per billion up to 500 parts per billion. In agreement with this, many reported cases of flow assisted corrosion damage under single-phase conditions occur within the temperature range of about 50° to 230° C., whereas under two-phase flow the range is at higher temperature of about 140° to 260° C.

Flow assisted corrosion of carbon steel in neutral low-oxygen water was investigated by M.Izumiya et al., "Corrosion and/or Erosion in BWR Plants and their Countermeasures," Water Chemistry and Corrosion Problems in Nuclear Power Plants, International Atomic Energy Agency, SM-264/4, 1983. Referring to FIG. 1, reproduced from the above referenced disclosure, the effect of dissolved oxygen on the flow assisted corrosion rates of a carbon steel comprised of about 0.15 weight percent carbon, 0.21 percent silicon, 0.69 percent manganese, and 0.013 percent phosphorous, in neutral water at 100° C. is shown. The carbon steel corrosion rates are significant when the water contains less than 20 parts per billion oxygen, but addition of more than 40 parts per billion oxygen reduces corrosion substantially. Oxygen gas addition to the feedwater of boiling water reactor plants has been practiced to reduce the iron released to reactors and the radiation levels on recirculation piping.

Although no comprehensive model of flow assisted corrosion which can fully describe the effect of the variables mentioned above has yet been developed, it is believed that the corrosion rates observed at high flow velocities are due to enhanced dissolution of magnetite leading to accelerated metal loss as iron oxidizes to replace the dissolved film. Additional information about flow assisted corrosion can be found, for example, in "Erosion-Corrosion in Nuclear Power Systems-An Overview," G.Granolino, Corrosion 87, San Francisco California, paper no. 86.

It is an object of this invention to provide a method for reducing the flow assisted corrosion of carbon steel components exposed to flowing low-oxygen water.

BRIEF DESCRIPTION OF THE INVENTION

We have discovered that the flow assisted corrosion of a carbon steel component exposed to flowing low-oxygen water can be reduced by a method comprising, forming a coating of a platinum group metal on the carbon steel component, and providing a ratio in parts per billion of hydrogen to oxygen of about 1:8 or greater in the water. As used herein, the term "platinum group metal" means metals from the group consisting of platinum, palladium, osmium, ruthenium, iridium, rhodium, and mixtures thereof. The ratio of hydrogen to oxygen is expressed herein in parts per billion, however, it should be understood that the ratio in parts parts per billion of hydrogen to oxygen of about 1:8 is equivalent to the stoichiometric ratio of hydrogen to oxygen of about 2:1.

DETAILED DESCRIPTION OF THE INVENTION

Figure 1:
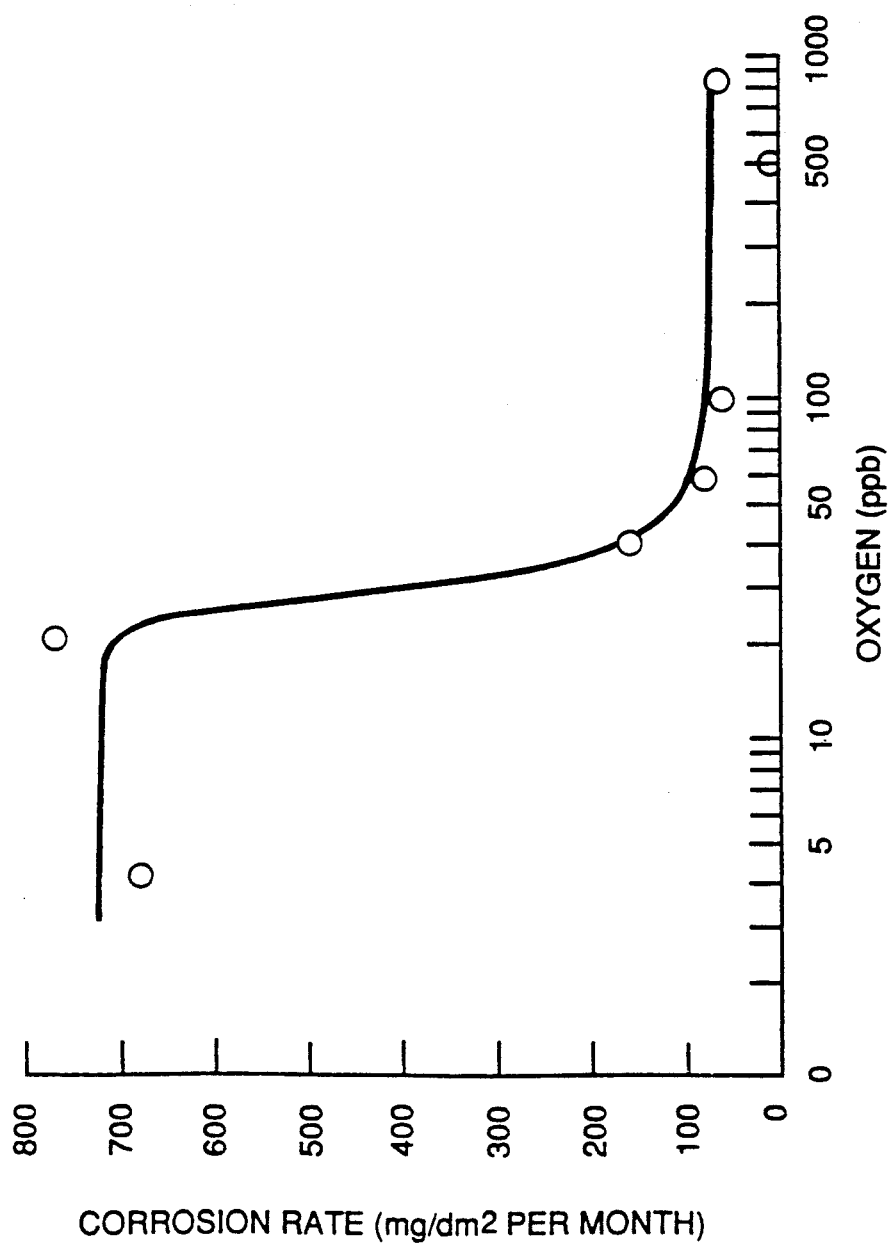
FIG. 1 is a graph showing the weight loss on a carbon steel sample exposed to flowing water at 100° C., and at various oxygen concentrations.

It is known that oxygen can be added to low-oxygen water, e.g. the feedwater of nuclear reactors, to decrease flow assisted corrosion of carbon steel components. However, it is well documented that stress corrosion cracking of stainless steel, low alloy steel, and nickel based alloys occurs at higher rates when oxygen is present at concentrations of about 5 parts per billion or greater in the high temperature water of a nuclear reactor. Therefore, it is desirable to minimize oxygen concentration in reactor water to reduce stress corrosion cracking of stainless steel, low alloy, and nickel based alloy components.

We have found that a coating of a platinum group metal on carbon steel components increases the corrosion potential of the component in low-oxygen water. As a result, the thin oxide layers that are soluble in flowing low-oxygen water and lead to unacceptable levels of flow assisted corrosion are not formed on the components. Instead, flow assisted corrosion is substantially reduced on the coated components when the water is provided with a ratio of hydrogen to oxygen of 1:8 or greater.

A suitable coating of the platinum group metal is at least sufficient to increase the corrosion potential at the surface of the carbon steel. For example, a suitable coating can be formed by electroless plating for about 30 seconds or more, and more preferably a coating of about 0.3 microns or greater. The platinum group metal coating can be deposited by methods well known in the art for depositing continuous or substantially continuous coatings on metal substrates, such as: plasma spraying, flame spraying, chemical vapor deposition, physical vapor deposition processes such as sputtering, welding such as metal inert gas welding, electroless plating, and electrolytic plating. Additional information about such coating processes can be found, for example in, Metallic & Ceramic Coatings: Production, High Temperature Properties & Applications," M.G Hocking, V. Vasantasree, P.S. Sidky, Longman Scientific & Technical, Essex England, 1989, incorporated herein by reference.

A ratio of hydrogen to oxygen of about 1:8 or greater, respectively, is provided in the flowing water that the carbon steel component is exposed to. Recirculated core water can be sampled to determine the ratio of hydrogen to oxygen in the water. If necessary, additional hydrogen is injected in the feedwater of the nuclear reactor to provide the 1:8 or greater ratio of hydrogen to oxygen.

Additional features and advantages of the method of this invention are further shown by the following examples.

The flow assisted corrosion testing performed in the following examples was performed in a circulating water loop comprised of a one liter autoclave with heat exchangers, a reservoir and conditioning tank for controlling the water chemistry, and an analytical loop for monitoring the pH, resistivity, and dissolved oxygen concentration of the feedwater. A Lapp Pulsafeeder pump provided a flow rate of either 20 milliliters per minute or 200 milliliters per minute in the autoclave. The autoclave was formed from a titanium alloy comprised of about 4 weight percent vanadium and 6 weight percent aluminum, and having a well-oxidized surface. All other heated portions of the system were formed from the same well-oxidized titanium alloy or titanium.

Water in the loop was purified through a demineralizer, an organic removal column, and a filter before passage into a 60 liter AISI 316 stainless steel conditioning tank, where the water was equilibrated by adding oxygen in a nitrogen carrier gas, and hydrogen to establish the desired ratio of hydrogen to oxygen in the water. The dissolved oxygen concentration was measured by an Orbisphere model 2713 from inlet water to the autoclave, and outlet water from the autoclave. All testing was carried out at a water temperature of 285° C. and pressure of 1200 psig.

EXAMPLE 1

Plain carbon steel, ASTM designation 1018 comprised of about 0.5 to 0.2 carbon and 0.6 to 0.9 weight percent manganese, test coupons about 0.1 by 0.7 by 2.5 centimeters were obtained. Several coupons were ultrasonically cleaned with acetone, ethanol, and deionized water and etched in 50 volume percent hydrochloric acid at 65° C. for two minutes and water rinsed. The etched coupons were coated with palladium in an electroless plating solution, First Choice Electroless Palladium P-83, obtained from Callery Chemical Co., Pennsylvania. The thickness of the palladium coating was measured with a Seiko X-ray thickness gauge before and after corrosion testing. The average thickness was about 0.3 microns of coating on each coupon.

Figure 2:
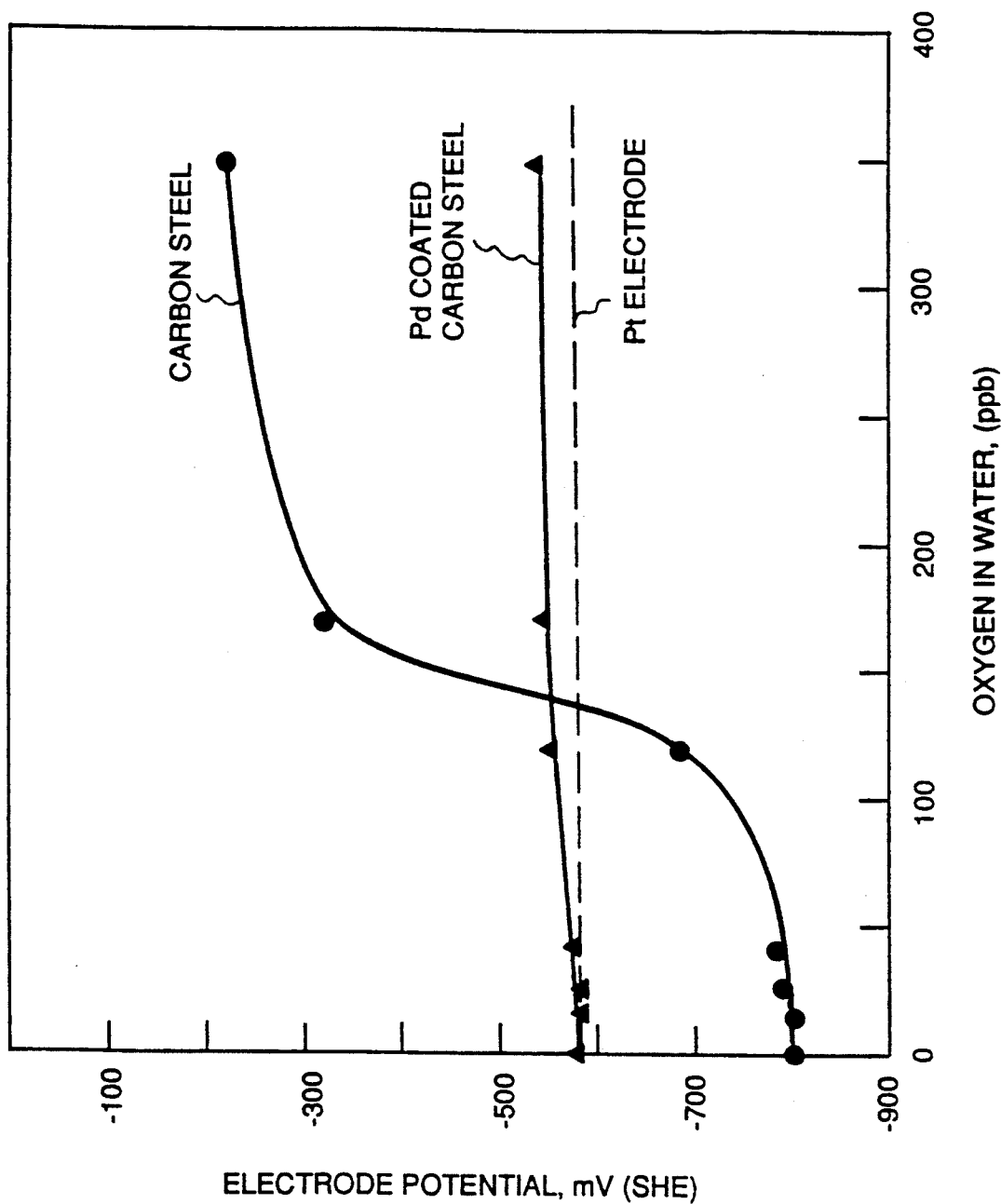
FIG. 2 is a graph showing the corrosion potential of samples of carbon steel, pure platinum, and palladium coated carbon steel exposed to flowing water at 285° C., comprised of 150 parts, per billion hydrogen, and varying amounts of oxygen.

A coupon of the plain carbon steel, a coupon of pure platinum, and a coupon of the palladium coated carbon steel were placed in the the circulating water loop described above. The test loop was operated at the 200 milliliters per minute flow rate. The coupons were exposed to the flowing water in the autoclave for 24 hours, the water being comprised of about 150 parts per billion (ppb) hydrogen and various levels of oxygen concentration as shown in FIG. 2. A carbon steel wire had been spot welded to each coupon and the wire was encapsulated in Teflon. The wire was used for measuring the electrochemical potential of each coupon. The electrochemical potentials were measured with a Keithley 161 electrometer, using a zirconia high-temperature pH sensor with a copper/cuprous oxide internal junction as a reference electrode as described by L.W. Niedrach and W.H. Stoddard, Corrosion, Vol. 41, p. 45, 1985.

The potentials were converted to the standard hydrogen electrode (SHE) scale on the basis of the calculated potential for the zirconia sensor in neutral water. The platinum electrode was used to monitor the effective reduction and oxidation potential of the water and to serve as a base for comparison to the responses of the coated and uncoated carbon steel coupons to changes in the ratio of oxygen to hydrogen in the water.

FIG. 2 is a graph showing the corrosion potential of the plain carbon steel coupon, the pure platinum coupon, and the palladium coated carbon steel coupon in water containing 150 ppb hydrogen and oxygen at various concentrations. FIG. 2 shows the corrosion potential of the platinum, and palladium coated carbon steel coupons was not affected by oxygen concentration. However, the uncoated carbon steel electrode did not follow the platinum electrode behavior, instead a lower potential at low-oxygen concentration was exhibited. This may be attributed to a large overvoltage for hydrogen evolution. At lower potentials the oxide formed on carbon steel is more soluble than the oxide formed at higher potentials, and the high corrosion rate in flowing low-oxygen water results.

EXAMPLE 2

Figure 3:
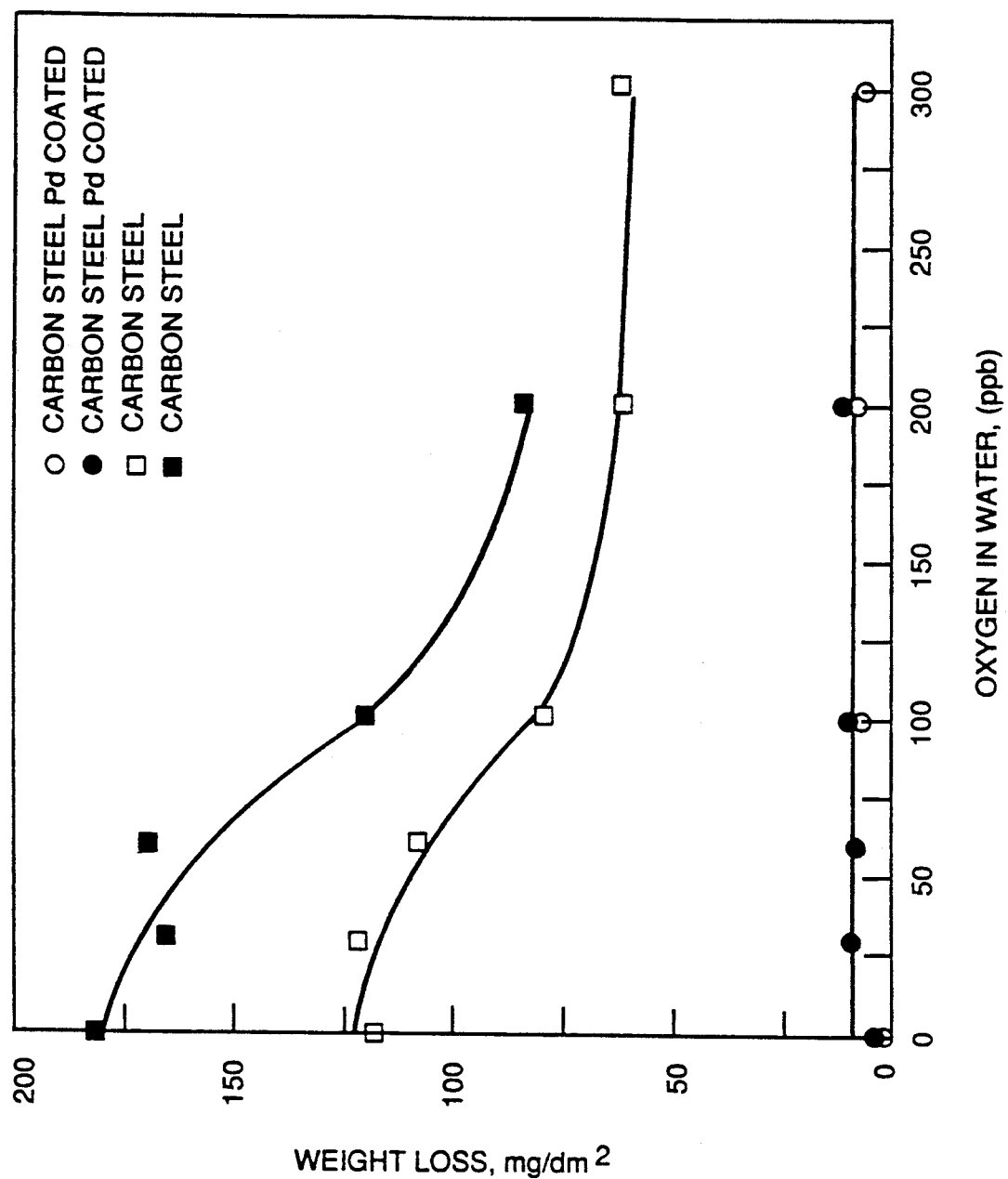
FIG. 3 is a graph showing the weight loss on samples of carbon steel and palladium coated carbon steel exposed to water at 285° C., flowing at 20 or 200 ml/min., and comprised of 150 parts per billion hydrogen, and varying amounts of oxygen.

Plain carbon steel test coupons were obtained, and some were coated with palladium as described in Example 1. Coupon pairs of one coated carbon steel coupon and one uncoated carbon steel coupon were weighed and placed in an autoclave for thirty days of exposure to flowing water having various oxygen concentrations. Some coupon pairs were tested at a flow rate of 20 milliliters per minute, and other coupon pairs were tested at a flow rate of 200 milliliters per minute. A series of such paired coupon tests were performed at various levels of oxygen in the water, as shown in FIG. 3. After exposure in the autoclave, the coated coupons were ultrasonically cleaned in deionized water, and the oxide on uncoated carbon steel coupons was stripped of in a solution of 0.5 grams per liter ethylquinoliniumidoide in 5 percent sulfuric acid to which a current of 7 volts was applied. The weight of each coupon was measured and the weight loss is shown as a function of oxygen concentration in the water in FIG. 3.

FIG. 3 shows the effect of the palladium coating on the weight loss of the carbon steel coupons in water containing 150 ppb hydrogen as a function of oxygen concentration. The filled square and circular data points show the weight loss for the tests performed at the flow rate of 200 milliliters per minute, and the outline square and circular data points show the weight loss for the tests performed at the flow rate of 20 milliliters per minute. The weight loss of carbon steel was significantly reduced by the palladium coatings. At low oxygen concentration the uncoated carbon steel coupon suffered relatively high weight loss from corrosion, due to the higher solubility of the oxide film formed on the coupons in the low-oxygen water. In contrast, the palladium coated carbon steel coupons experienced almost no weight loss in the low-oxygen water comprised of 150 parts per billion hydrogen.

What is claimed is:

1. A method of reducing flow assisted corrosion on a carbon steel component exposed to flowing water having a low oxygen content that promotes the flow assisted corrosion comprising:
   forming a coating of a platinum group metal on the component that increases the corrosion potential of the component, and providing a ratio, in parts per billion mass, of hydrogen to oxygen of about 1:8 or more of hydrogen in the water.

2. The method of claim 1 wherein the coating is sufficient to provide catalytic recombination of hydrogen and oxygen.

* * * * *